United States Patent

Gmeiner et al.

[11] Patent Number: 5,424,513
[45] Date of Patent: Jun. 13, 1995

[54] METHOD FOR PRODUCING TRANSFORMERS, ESPECIALLY TRANSFORMERS FOR DISTRIBUTION SYSTEMS, AND A DEVICE FOR CARRYING OUT THIS METHOD

[75] Inventors: Paul Gmeiner, Lieli; Sten Schmidt, Schlieren, both of Switzerland

[73] Assignee: Micafil AG, Zurich, Switzerland

[21] Appl. No.: 974,628

[22] Filed: Nov. 12, 1992

[30] Foreign Application Priority Data

Nov. 18, 1991 [CH] Switzerland .................. 3363/91

[51] Int. Cl.6 ............................................. H05B 1/02
[52] U.S. Cl. ...................... 219/492; 219/497; 219/499; 219/505; 34/553; 361/42
[58] Field of Search ............... 219/492, 494, 497, 499, 219/501, 505; 34/524, 525, 553; 361/42, 57

[56] References Cited

U.S. PATENT DOCUMENTS

| | | | |
|---|---|---|---|
| 3,195,044 | 7/1965 | Flanagan | 219/497 |
| 3,373,500 | 3/1968 | Winter | 34/1 |
| 4,369,353 | 1/1983 | Duenke | 219/492 |
| 5,131,167 | 7/1992 | Bachman et al. | 34/1 |

FOREIGN PATENT DOCUMENTS

3927964A1 3/1991 Germany .

*Primary Examiner*—Mark H. Paschall
*Attorney, Agent, or Firm*—Burns, Doane, Swecker & Mathis

[57] ABSTRACT

The method and the device for carrying out the method are used for producing transformers (27, 28, 29) which are filled with insulating means, especially transformers for distribution systems. In the case of the method, solid insulation of the transformers is dried in the device before addition of an insulating means, in that the low-voltage windings are short-circuited in every transformer, and the parallel-connected high-voltage windings (30, 31, 32) are heated by means of a low-frequency AC current. In this case, the mean temperature of the windings of the transformers is determined at the same time by measuring the low-frequency AC current, in order thus to make it possible to dry the solid insulation well. In carrying out the method, the mean temperature of the high-voltage windings (for example 31) of each transformer (for example 28) is determined independently of the mean temperature of the windings of each transformer, preferably additionally, by means of a resistance measuring apparatus (14) which is connected in series with the at least one part of the high-voltage windings (for example 31). As a result of suitable guidance of the low-frequency AC current and/or switching of the resistance measuring apparatus (14), the mean temperatures of the high-voltage windings (for example 28) and of the low-voltage windings of one of the transformers (for example 31) can be determined, and the other transformers (for example 30, 32) can be heated further at the same time.

11 Claims, 5 Drawing Sheets

METHOD FOR PRODUCING TRANSFORMERS, ESPECIALLY TRANSFORMERS FOR DISTRIBUTION SYSTEMS, AND A DEVICE FOR CARRYING OUT THIS METHOD

BACKGROUND OF THE INVENTION

1. Field of the Invention

The invention is based on a method for producing at least two transformers, especially for distribution systems, in which solid insulation of the transformers is dried before the addition of insulating means, in that the low-voltage windings in the transformers are short-circuited, and the high-voltage windings are connected in parallel with one another and are heated by means of a low-frequency AC current, and in this case the mean temperature of the windings of the parallel-connected transformers is monitored by measuring the low-frequency AC current.

2. Discussion of Background

In the production of transformers which are provided especially for power distribution tasks, it is necessary for solid insulation of the windings to be dried first, before filling of the insulating means, such as insulating oil, which surround the high-voltage and low-voltage windings. According to a method which is disclosed in DE 3,927,964 A, this drying can be achieved, for example, by the low-voltage windings of the transformers being short-circuited and by the transformers being heated by means of a low-frequency AC current which is supplied to the high-voltage windings. In order in this case to make it possible for the method to be carried out quickly and hence economically, and, at the same time, in order to avoid an excessive heating voltage (causing undesired electrical flashovers on the windings), the short-circuit impedance in the heating circuit is kept low by reducing the frequency of the heating current. Normally, when the method is being carried out, the transformers which are enclosed in a vacuum autoclave under atmospheric conditions or with a slightly reduced pressure are first heated to a mean winding temperature of approximately 100° C., using low-frequency AC current. This temperature is monitored indirectly by measuring the heating current. The temperature is kept constant by suitable adaptation of the heating current. In this case, the solid insulation is predried. The transformers are thus completely dried at approximately 130° C., in a variable vacuum and with the residual moisture being emitted. This vacuum can subsequently be used for the complete and rapid filling of the transformers with the insulating means.

However, in order to heat transformers of different type and size as uniformly as possible, this method requires suitably adapted power supplies. Such power supplies comprise in each case at least one frequency converter and control systems, and are comparatively costly. In addition, even slight deviations of specific method parameters can adversely affect uniform heating and hence the drying of the solid insulation. Furthermore, during the drying of a plurality of parallel-connected transformers, only the mean temperature of the high-voltage and/or low-voltage windings of all the transformers can be determined.

SUMMARY OF THE INVENTION

Accordingly, as it is specified in patent claim 1, one object of the invention is to provide a novel method and a device which is provided to carry out said method which allow transformers which are particularly reliable in operation to be produced in a simple and economical manner.

The method according to the invention is distinguished by the additional detection of further method parameters increasing the probability that the comparatively critical method step of drying the solid insulation can be carried out in a fault-free manner and in a particularly short time. In addition, the method according to the invention offers the capability for drying transformers of different sizes and types particularly easily and economically, in that the mean temperatures of the windings of these transformers are monitored independently of one another.

The device for carrying out the method according to the invention can be produced and operated comparatively cost-effectively, since it allows the solid insulation of transformers of different sizes and types to be dried, in the case of a suitable configuration, using only a single power supply. Power supplies which are adapted to different types and sizes of transformers can thus be dispensed with for simultaneous drying of different transformers.

Preferred exemplary embodiments of the invention and the further advantages which can be achieved using said exemplary embodiments are explained in more detail in the following text, on the basis of the drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
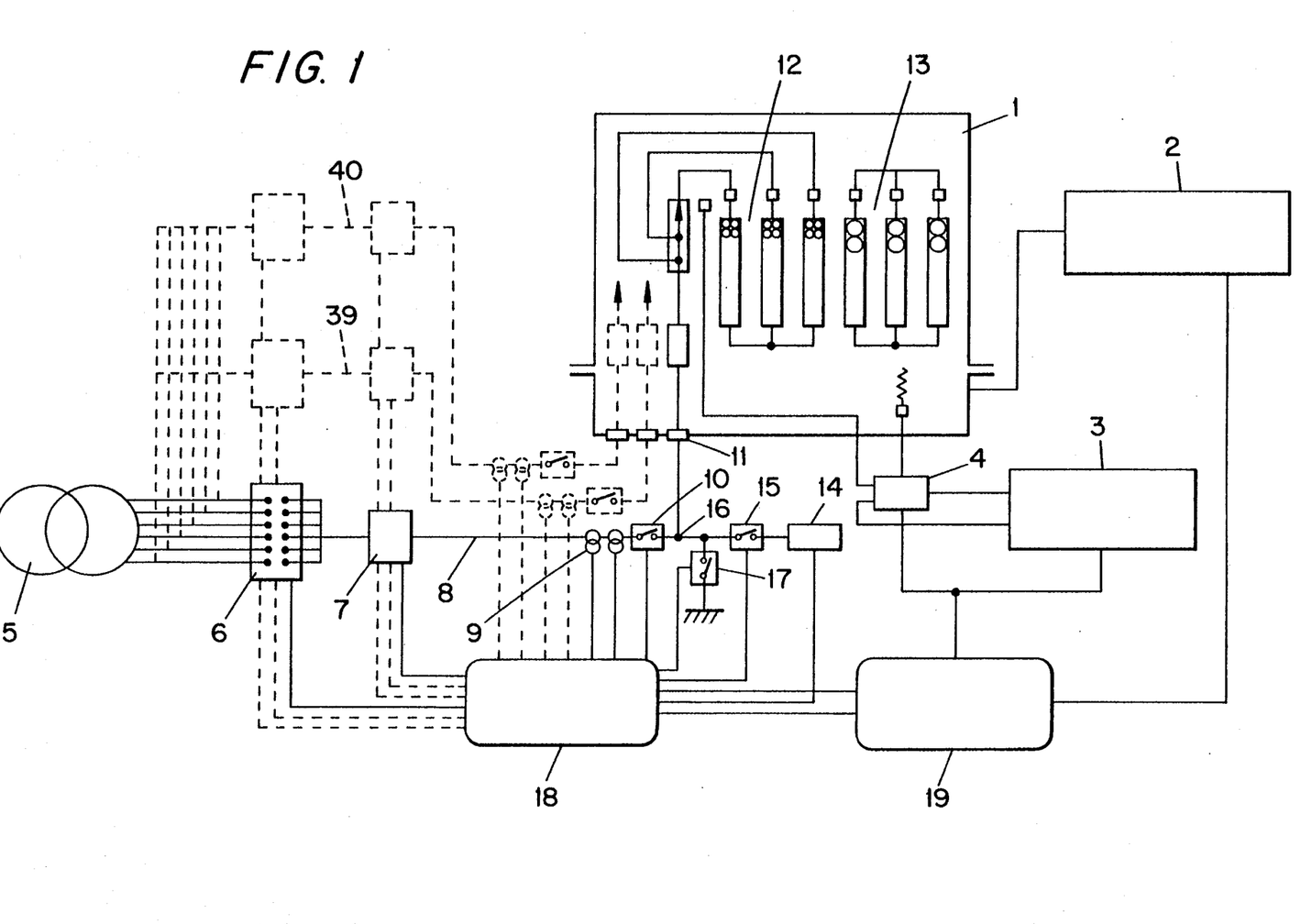
FIG. 1 shows an outline circuit diagram of a first embodiment of a device for carrying out the method according to the invention

Referring now to the drawings, wherein like reference numerals designate identical or corresponding parts throughout the several views, in the embodiment shown in FIG. 1 of the device for carrying out the method according to the invention, 1 designates a vacuum autoclave which is connected to an evacuating device 2. The reference numeral 3 relates to a reservoir, containing insulating oil, from which reservoir insulating oil can be passed via a filling device 4 into the vacuum autoclave 1. 5 designates a control transformer which acts via a switching device 6 on a frequency converter 7. Three-phase power supply leads 8 originating from the frequency converter 7 are monitored by current transformers 9 and are passed into the interior of the vacuum autoclave 1 via a switching device 10, by means of bushings 11.

In the vacuum autoclave 1, the high-voltage windings 12 and the low-voltage windings 13 of a distribution transformer which is still to be dried in the course of the production method, is still to be filled with insulating oil and is of three-phased construction are shown schematically. The high-voltage windings 12 of this transformer can be seen to be connected in star, while in contrast the low-voltage windings 13 are short-circuited at the bushings. Still further transformers which are to be dried and are subsequently to be filled with insulating oil are provided in the vacuum autoclave 1, the high-voltage windings of which transformers are connected via the power supply leads 8 to the output of the frequency converter 7. These further transformers may be of any desired type and size, and are not shown for reasons of clarity.

A resistance measuring apparatus 14 can be connected via a switching device 15 to the power supply leads 8 and hence to the high-voltage windings 12. The associated connecting points 16 are arranged for each phase, in each case between the switching device 10 and the corresponding bushing 11, on the power supply lead 8 corresponding to the phase. The connecting points 16 are connected to a further switching device 17 which grounds the potential of the connecting points 16 and hence also that of the high-voltage windings 12 of the transformer and of the high-voltage windings of the further transformers which are provided in the vacuum autoclave 1.

A control device 18 receives measurement signals which are emitted by the current transformers 9 and the resistance measuring apparatus 14, as well as status reports from the switching devices 6, 10, 15 and 17 and from the frequency converter 7. These data can be processed in the control device 18 or in a higher-level control apparatus 19. The control apparatus 19 acts both on the reservoir 3 and the filling device 4 as well as on the control device 18. The data which are produced in this case are used for controlling the method, which is described below, according to the invention for producing the transformers.

When the method is being carried out, the undried transformers, which are still free of insulating means, are placed in the vacuum autoclave 1. The switching device 10 is then opened and the switching device 15 closed, so that the electrical resistance of at least a part of the high-voltage windings of one or more of the transformers can now be measured at room temperature by means of the resistance measuring apparatus 14. The measured resistance value is stored in the control device 18. The resistance measuring apparatus 14 is subsequently isolated from the high-voltage windings 12 by opening the switching device 15, and the frequency converter 7 is connected to the high-voltage windings 12 by closing the switching device 10. An AC current which is supplied from the frequency converter and has a frequency of a few Hertz now heats the high-voltage windings 12, which are located in the vacuum autoclave at atmospheric pressure or at a slightly reduced pressure, and hence also the low-voltage windings of the transformers to a mean temperature of approximately 100° C. This temperature is monitored indirectly by measuring the heating current by means of the current transformers 9, and by measuring the voltage of the heating current. As a result of suitable adaptation of the heating current, the temperature is kept constant at approximately 100° C., and the solid insulation is hence predried. The transformers are then completely dried, with the residual moisture being emitted, at a mean temperature of the windings 12, 13 of approximately 130° C., which temperature is determined via the duration and magnitude of the low-frequency AC current, in a vacuum which is produced via the evacuating device 2.

In order in this case reliably to prevent excessive heating of the windings 12, 13, the mean temperature of at least a part of the high-voltage windings 12 is also determined, in addition, directly after reaching a predetermined mean temperature of the high-voltage and low-voltage winding. This is achieved using the device according to FIG. 1 by it being possible to connect the resistance measuring apparatus 14 in series with at least a part of the high-voltage windings 12. Before carrying out the resistance measurement, the low-frequency AC current is first interrupted by opening the switching device 10. The high-voltage windings 12 are then temporarily grounded by closing the switching device 17, and interfering residual voltages are thus kept away from the high-voltage windings 12. The switching device 15 is subsequently closed and the measurement of the electrical resistance of the high-voltage windings 12 is carried out.

Figure 2:
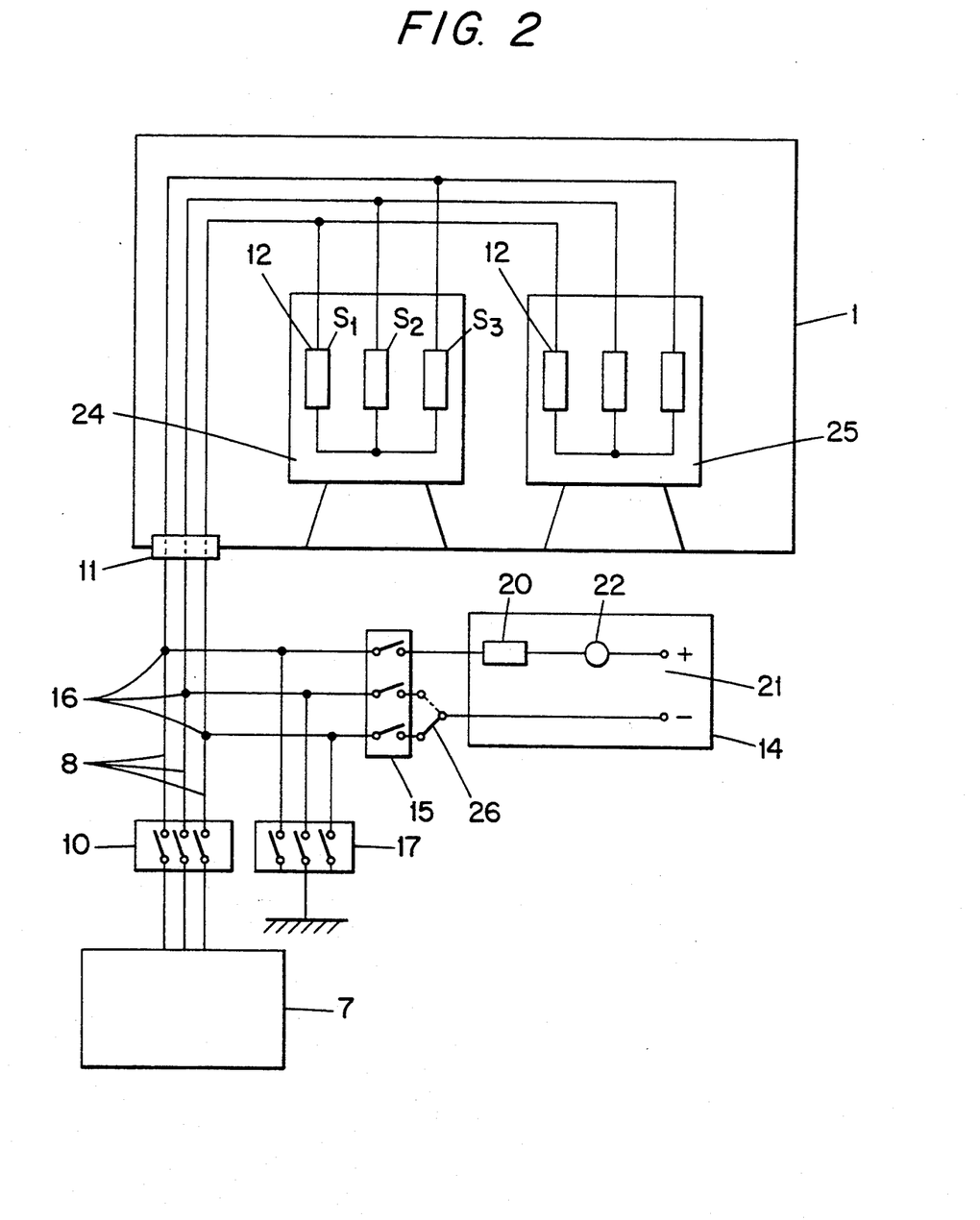
FIG. 2 shows a circuit diagram, which is represented in detail, of a part of the embodiment according to FIG. 1.

FIG. 2 shows how such a measurement can be carried out. It can be seen from this figure that the resistance measuring apparatus 14 has at least one measuring resistor 20, at least one DC power source 21 and at least one ammeter 22 connected in series. The electrical resistance of the measured part of the high-voltage windings 12 is determined in the control device 18 or in the control apparatus 19 from the current which is measured in this case, and the mean temperature of the high-voltage windings is determined from this by comparison with the value of the corresponding part of the high-voltage windings 12 which was previously determined and stored at room temperature.

In order to make particularly gentle drying possible, the mean temperature of the short-circuited low-voltage windings, which are not shown in FIG. 2, can additionally be determined from the mean temperature of the high-voltage and of the low-voltage windings, and from the mean temperature of the high-voltage windings.

The mean temperatures, determined in accordance with the method according to the invention, of the high-voltage and/or of the low-voltage windings of the transformers which are to be dried can be further processed in the control device 18 in order to achieve additional control and regulation tasks.

If it is found during this temperature measurement that the desired mean temperatures of the high-voltage and of the low-voltage windings 12, 13 have not yet been reached, the heating process is continued after disconnecting the resistance measuring apparatus 14 and closing the switching device 10. If, in contrast, at least one of the desired mean temperatures of the windings is exceeded, the power supply leads 8 to the high-voltage windings 12 remain interrupted and the heating current is not supplied again until the mean temperature, determined via the resistance measuring apparatus 14, of the high-voltage and/or of the low-voltage winding has fallen below the desired value again.

As can be seen from FIG. 2, in the case of three-phase transformers 24, 25 having phase windings $S_1$, $S_2$ and $S_3$ provided on the high-voltage side, the electrical resistance of the windings allocated to only two phases, for example $S_1$ and $S_3$, can be measured, and the mean temperature of the high-voltage windings 12 of transformers 24 and 25 of identical construction can be determined from this. However, the electrical resistance of the windings allocated to all the phases, namely $S_1$, $S_2$ and $S_3$, can also be measured, and the mean temperature of the high-voltage windings 12 can be determined from this. For this purpose, for example, the two windings $S_1$ and $S_2$ can be connected in parallel with one another via an additionally provided changeover switch 26, and the parallel circuit can be connected in series with the winding $S_3$.

Figure 3:
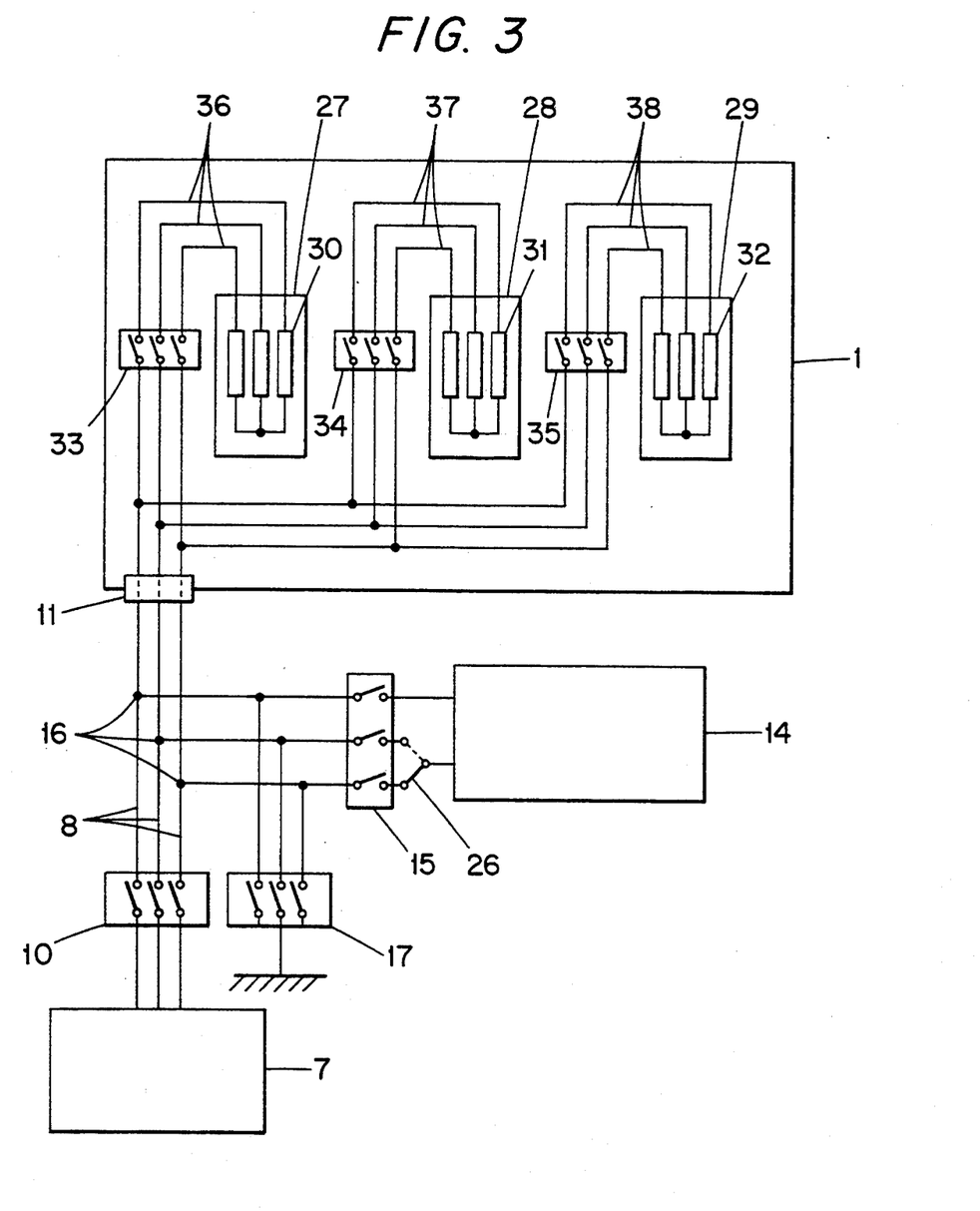
FIG. 3 shows a circuit diagram of a part of a second embodiment of the device for carrying out the method according to the invention.

FIG. 3 indicates a further embodiment of a device for carrying out the method according to the invention, in which parts acting in a manner corresponding to the embodiment according to FIGS. 1 and 2 are also shown in a corresponding manner. In the vacuum autoclave 1, this embodiment has transformers 27, 28 and 29 with high-voltage windings 30, 31 and 32, as well as switching devices 33, 34 and 35 which are provided in each case in power supply leads 36, 37, 38 of the individual transformers 27, 28, 29.

The transformers 27, 28 and 29 which are shown may be of different type and size and may nevertheless be dried quickly and without problems using only a single power supply. This is achieved by the electrical resistances of the high-voltage windings being measured, initially at room temperature, by suitable operation of the switching devices. If, for example, it is intended to measure the resistance of the high-voltage winding 31 of the transformer 28 at room temperature, then the switching devices 10, 17, 33 and 35 are opened and the switching devices 15 and 34 are closed. For subsequent heating using low-frequency AC current, the switching devices 15 and 17 are opened, and the other switching devices are closed. As soon as the mean temperature, calculated via the current measurement in the control device 18 or in the control apparatus 19, of the windings of the heated transformers 27, 28, 29 exceeds a predetermined limiting value, the heating current is interrupted by opening the switching device 10 and, after temporary grounding of the high-voltage windings 30, 31 and 32 and after suitable operation of the switching devices 15, 33, 34 and 35, the electrical resistances of the high-voltage windings are measured in sequence. If it is found in this case that the mean temperature of the high-voltage winding and/or the mean temperature of the low-voltage winding of one of the transformers, for example 28, may not be increased any further, while in contrast the high-voltage and/or low-voltage windings of the remaining transformers, for example 27, 29, have, however, not yet been sufficiently heated, then the switching devices 15 and 34 are opened and only the remaining transformers, for example 27 and 29, are subsequently heated, by closing the switching devices 10, 33 and 35.

In consequence, it is possible to dry a plurality of transformers of different sizes and types, and subsequently to fill them with insulating means, using only a single power supply. In contrast to this, devices according to the prior art also require different power supplies for the transformers which are of different dimensions. FIG. 1 shows such power supplies 39, 40, which are required in the case of the prior art, by means of dashed lines.

Figure 4:
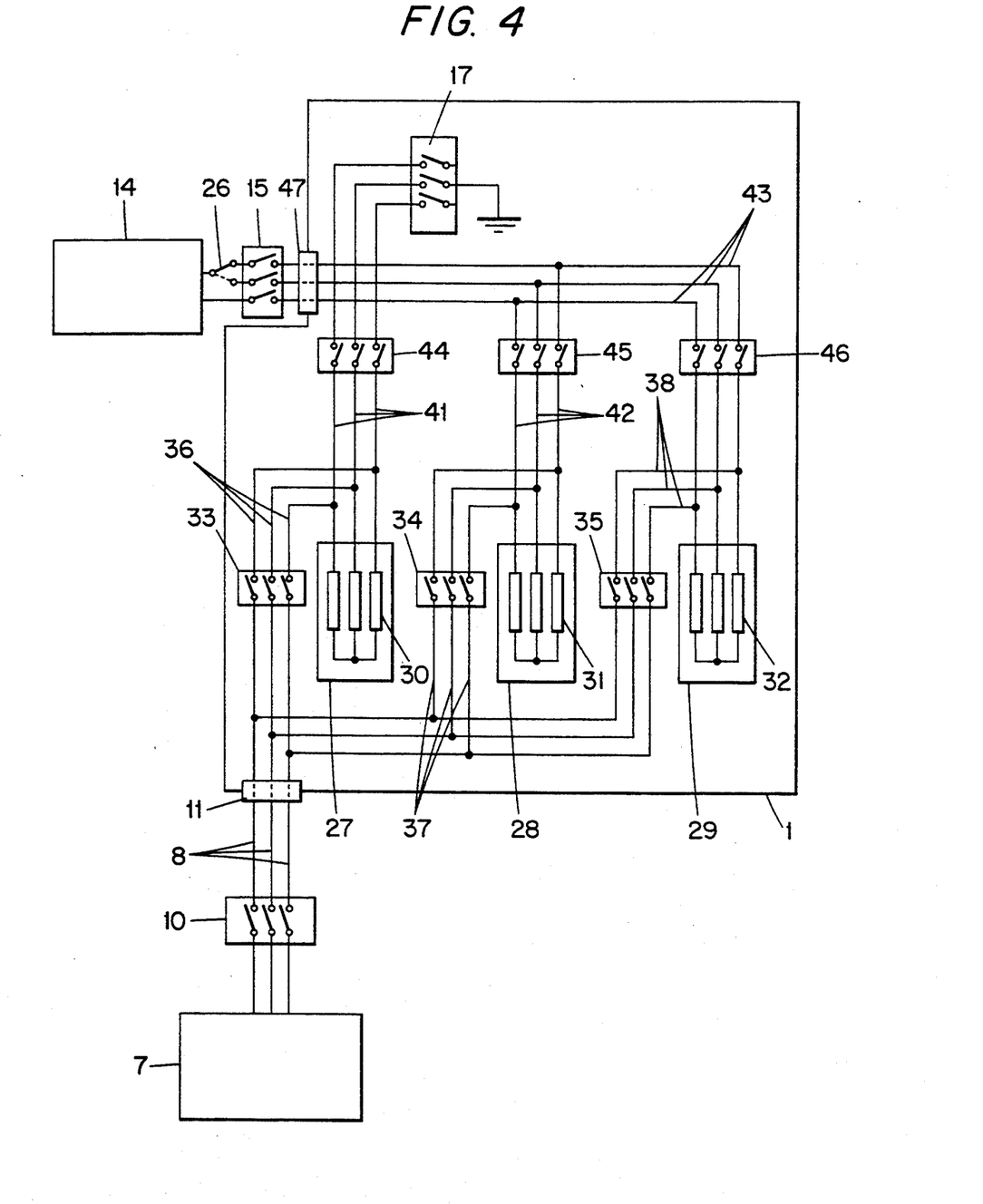
FIG. 4 shows a circuit diagram of a part of a third embodiment of the device for carrying out the method according to the invention.

In the embodiment, shown in FIG. 4, of the device for carrying out the method according to the invention, the resistance measuring apparatus 14 can be connected via a vacuumproof measurement bushing 47 and in each case one of three measurement leads 41, 42, 43 to one of the high-voltage windings 30, 31, 32. In each case one of three switching devices 44, 45 and 46 is arranged in the measurement leads 41, 42 and 43 respectively.

In consequence, in contrast to the embodiment in accordance with FIG. 3, it is additionally possible for the mean temperature of the high-voltage winding of one of the transformers 27, 28, 29 to be measured without having to interrupt the power supply lead to the other transformers. If, for example, it is intended to measure the mean temperature of the high-voltage winding 31 of the transformer 28 while the transformers 27, 28 and 29 are being dried, the power supply lead to the high-voltage winding 31 is first interrupted by opening the switching device 34, and this winding is then grounded with the switching devices 17 and 45 closed. In this case, the switching devices 15, 44 and 46 are opened. Subsequently, the switching device 17 is opened and the switching device 15 is closed. The resistance measuring apparatus now determines the mean temperature of the high-voltage winding 31 or of a part thereof, depending on the position of the changeover switch 26. The high-voltage windings 30 and 32 are further heated, using the low-frequency AC current, during this temperature measurement.

Figure 5:
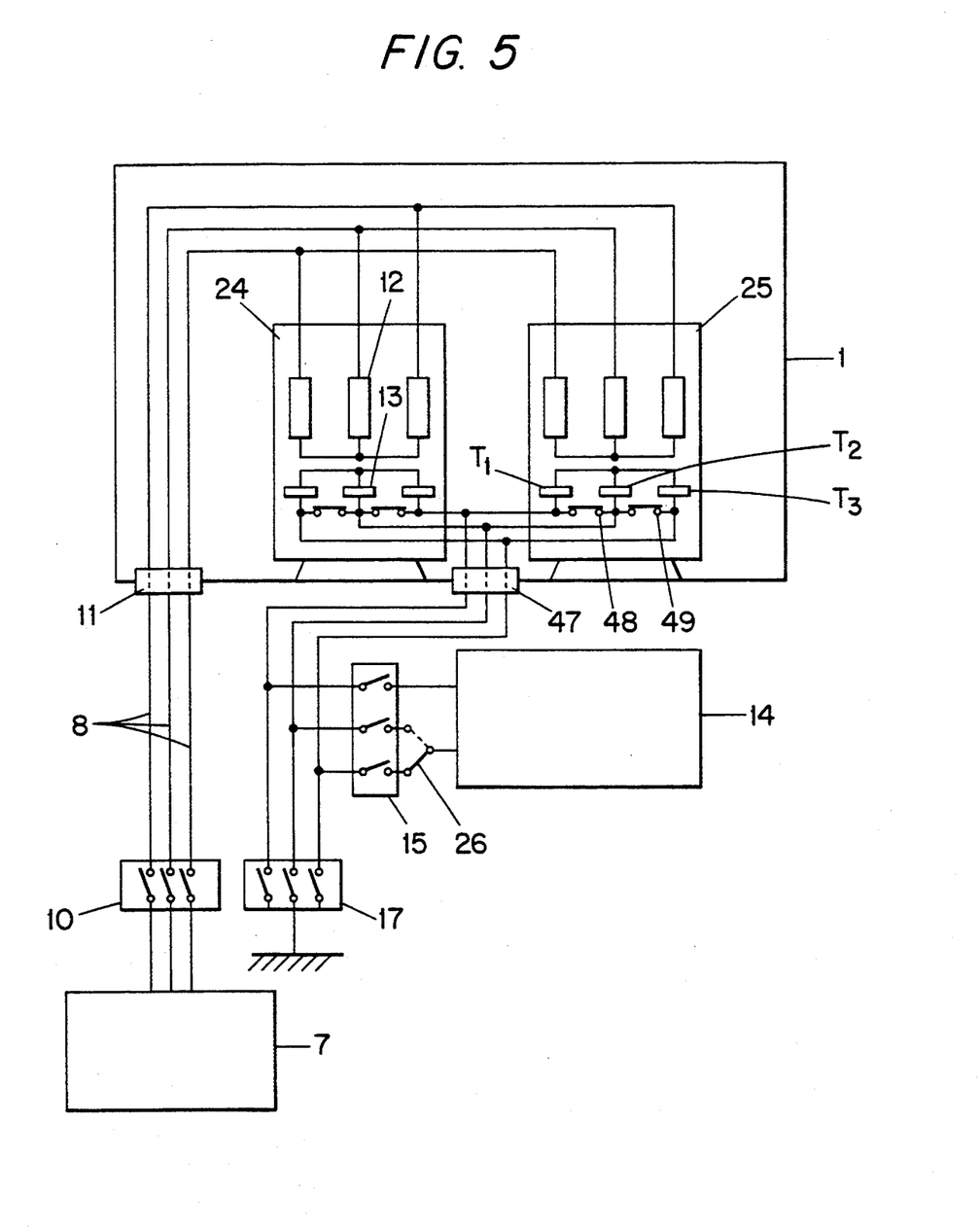
FIG. 5 shows a circuit diagram of a part of a fourth embodiment of the device for carrying out the method according to the invention.

FIG. 5 indicates an embodiment of a device for carrying out the method according to the invention, in which parts which act in a manner corresponding to the embodiment according to FIGS. 1 and 2 are also designated in a corresponding manner. In the vacuum autoclave 1, this embodiment has transformers 24 and 25 with high-voltage windings 12 and low-voltage windings 13. The low-voltage windings 13 of each transformer 24, 25 contain phase windings $T_1$, $T_2$, $T_3$ which can be connected to one another or isolated from one another via switching devices 48, 49. The input of the resistance measuring apparatus is passed via the changeover switch 26, the switching device 15 and the vacuumproof measurement bushing 47 to the connections of the low-voltage windings 13 of the transformers 24 and 25, which connections are located in the interior of the vacuum autoclave 1. The switching devices 48 and 49 are effectively connected via data links, which are not shown, to the control device 18, which is not shown in FIG. 5, or to the control apparatus 19, which is likewise not shown in this figure.

In the case of this embodiment of the invention, the switching devices 48, 49 which are monitored by the control apparatus 19 remain closed during heating of the windings 12, 13, so that a short-circuit current can flow in the low-voltage windings 13. If it is now intended to determine the electrical resistance, and hence the mean temperature, of the low-voltage winding, the low-frequency AC current is first interrupted by opening the switching device 10, and the low-voltage windings 13 are then temporarily grounded by briefly closing the switching devices 17. Subsequently, the switching devices 48, 49 are opened, two, for example $T_1$ and $T_3$, of the phase windings $T_1$, $T_2$, $T_3$ of the low-voltage winding 13 are connected in series with the resistance measuring apparatus 14 by closing the switching device 15 and the changeover switch 26, and the electrical resistance of these two phase windings is determined.

In a further refinement of the invention it is also possible to determine directly the mean temperature of the high-voltage winding and that of the low-voltage windings by means of one electrical resistance measurement. For this purpose, two resistance measuring apparatuses can be provided, but by means of a suitable changeover-switching device it can also be ensured that this measurement task can be carried out using only one resistance measuring apparatus, connected alternately to the high-voltage and to the low-voltage winding.

Furthermore, the temperature of the high-voltage winding can also be determined directly from the measurement of the winding current and of the winding voltage while maintaining the heating current. After reaching the mean temperature of the windings, the low-frequency AC current is reduced in the frequency converter 7 to very-low frequencies, for example 0.1 to 0.01 Hz. As a result of suitable operation of the switching devices, for example by opening the switching devices 34 and 35 in the embodiment according to FIG. 3, the high-voltage winding, for example of the transformer 27, is isolated from the high-voltage windings of the other transformers, for example 28, 29. The very-low frequency AC current now still heats only the high-voltage winding of the transformer 27. In this case, because of the very-low frequency of the heating current, only the high-voltage winding is heated in a predominant manner. As a result of suitable operation of the switching devices, the high-voltage winding of another of the transformers can also be heated individually in a corresponding manner. The mean temperature of the high-voltage winding can easily be determined, and the heating current controlled accordingly, during the heating, via a measurement of the heating current and of the heating voltage, and subsequent calculation of the electrical resistance of the winding.

Obviously, numerous modifications and variations of the present invention are possible in light of the above teachings. It is therefore to be understood that within the scope of the appended claims, the invention may be practiced otherwise than as specifically described herein.

What is claimed is:

1. A method of drying insulation of transformers having at least low-voltage and high-voltage windings, comprising the steps of:
   (a) short circuiting said low-voltage windings;
   (b) connecting said high voltage windings in parallel;
   (c) applying AC current to said high-voltage windings at a first pressure;
   (d) determining and monitoring a temperature of said low-voltage and high-voltage windings by measuring a winding current and a winding voltage due to AC current;
   (e) predrying said insulations at a first predetermined temperature;
   (f) further drying the predried insulations under vacuum using a second predetermined temperature which is higher than said first predetermined temperature;
   (g) upon detecting said second predetermined temperature, selectively isolating the high-voltage winding of a first of said transformers from the high-voltage winding of the remaining transformers and isolating the high-voltage winding of said remaining transformers from said AC current;
   (h) reducing the frequency of said AC current after detecting said second predetermined temperature;
   (i) determining an electrical resistance of the high-voltage winding of said isolated first transformer by measuring current and voltage of said high-voltage winding of said first transformer at said reduced frequency AC current; and
   (j) controlling the reduced frequency AC current using the determined electrical resistance of the high-voltage winding of said first transformer.

2. The method of claim 1, wherein said first pressure is approximately atmospheric pressure.

3. A method of drying the insulations of transformers having at least low-voltage and high-voltage windings, comprising the steps of:
   (a) short circuiting said low-voltage windings;
   (b) connecting said high-voltage windings in parallel;
   (c) applying AC current to said high-voltage windings at a first pressure;
   (d) determining and monitoring a temperature of said low-voltage and high-voltage windings by measuring a winding current and a winding voltage due to said AC current;
   (e) predrying said insulations at a first predetermined temperature;
   (f) further drying the predried insulations under vacuum using a second predetermined temperature which is higher than said first predetermined temperature;
   (g) upon detecting said second predetermined temperature, isolating the high-voltage winding of a first of said transformers from the high-voltage windings of remaining transformers and from said AC current;
   (h) measuring an electrical resistance of the high-voltage winding of said first transformer using a resistance measuring device;
   (i) heating at least one of said remaining transformers during measurement of the electrical resistance of the high-voltage winding of said first transformer; and
   (j) controlling said AC current using the measured electrical resistance of the high-voltage winding of said first transformer.

4. The method as claimed in claim 3, wherein the electrical resistance of the high-voltage and/or low-voltage winding is measured first, before heating using low-frequency AC current.

5. The method as claimed in claim 3, wherein the low-frequency AC current is briefly interrupted, wherein the short-circuit loops of the short-circuited low-voltage windings are temporarily opened during the interruption of the low-frequency AC current, and wherein the electrical resistance of at least a part of one low-voltage winding is measured during the temporary opening of the short-circuit loops.

6. The method of claim 3 further comprising the steps of:
   (a) connecting said resistance measuring device through a first switching device to a power supply lead of the high-voltage winding of said first transformer;
   (b) after carrying out a resistance measurement, connecting said power supply lead through a second switching device to said AC current; and
   (c) before carrying out said resistance measurement, opening said second switching device and connecting said power supply lead through a third switching device to ground.

7. The method of claim 6 further comprising the step of:

(a) providing at least one of a plurality of fourth switching devices in the power supply lead to the high-voltage windings of said transformers.

8. The method of claim 7 further comprising the step of:
    (a) connecting the resistance measuring device to a power supply lead which is common to all of the transformers.

9. The method of claim 7 further comprising the step of:
    (a) connecting the resistance measuring device via one of a plurality of fifth switching devices to a power supply lead for the high-voltage winding of an individual one of the transformers.

10. The method of claim 3 further comprising the steps of:
    (a) arranging a first switching device in short-circuited loops of the short-circuited low-voltage windings; and
    (b) connecting at least one resistance measuring device via a second switching device to the low-voltage windings of the transformers.

11. Apparatus for drying insulations of plural transformers, each of the transformer having at least a low-voltage winding and a high-voltage winding, the apparatus comprising:
    (a) an autoclave for drying plural transformers;
    (b) a reservoir for supplying insulating oil to said plural transformers in said autoclave;
    (c) a power supply for applying AC current to said plural transformers;
    (d) a resistance measuring apparatus for measuring electrical resistance of at least a portion of at least one of said high-voltage winding and said low-voltage winding for at least one of said plural transformers;
    (e) a first switching device for selectively connecting current from said power supply to said at least a portion of a high-voltage winding and a low-voltage winding via said resistance measuring apparatus;
    (f) a second switching device for selectively grounding said at least a portion of said high-voltage winding and said low-voltage winding;
    (g) an additional switch for selectively isolating said at least a portion of said high-voltage winding and said low-voltage winding from windings of remaining transformers in said autoclave; and
    (h) a controller for regulating a frequency of current provided by said power supply to said plural transformers using an electrical resistance of the at least a portion of said high-voltage winding and said low voltage winding of said first transformer as detected by said resistance measuring device.

* * * * *